March 26, 1963 D. E. GOLAY 3,082,738
INDIVIDUAL COW MILK RECEIVER AND MEASURER
Filed July 7, 1961 2 Sheets-Sheet 1
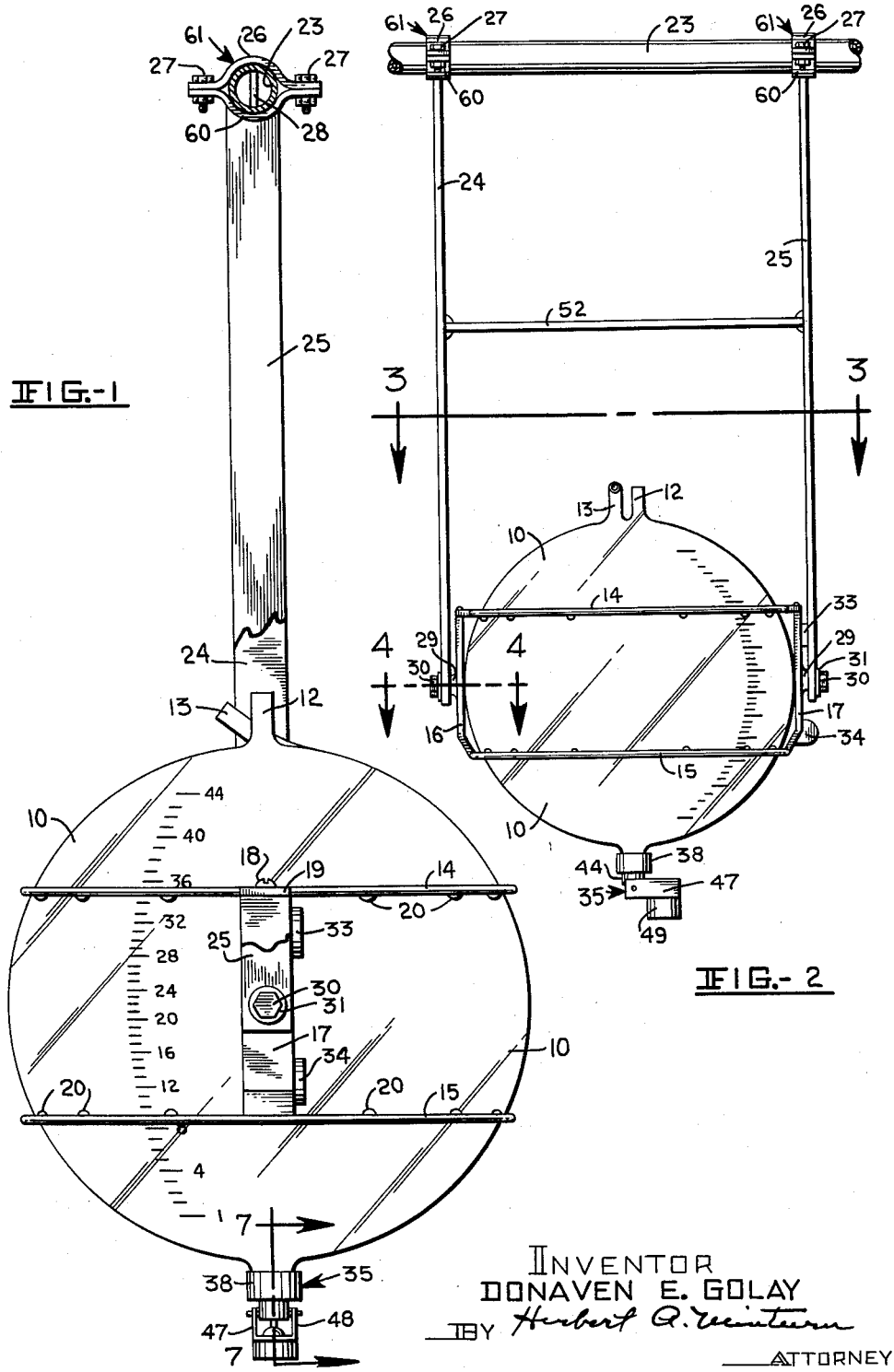
INVENTOR
DONAVEN E. GOLAY
BY Herbert Q. Weinturn
ATTORNEY

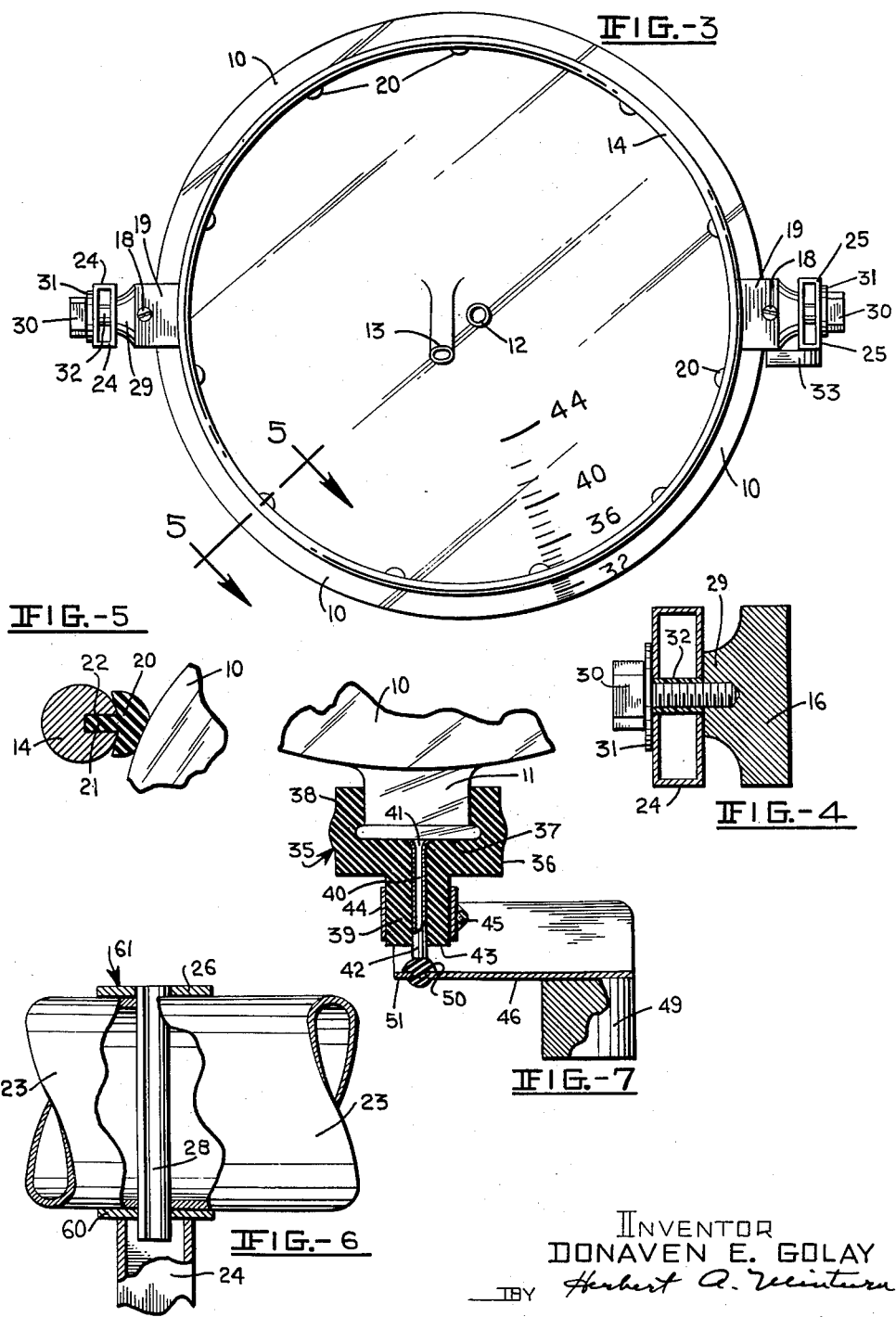

United States Patent Office 3,082,738
Patented Mar. 26, 1963

3,082,738
INDIVIDUAL COW MILK RECEIVER AND
MEASURER
Donaven E. Golay, Cambridge City, Ind., assignor to
Golay & Co., Inc., Cambridge City, Ind.
Filed July 7, 1961, Ser. No. 122,467
2 Claims. (Cl. 119—14.46)

This invention concerns a device to be employed in conjunction with milk pipe lines and is to be mounted between the cow and the pipe line as a means for receiving and holding milk from an individual cow until the quality as well as quantity has been checked, following which milk is taken from the receiver into the pipe line to be conveyed to the milk processing or storage zone.

Specifically, the invention involves a flask which is rockably mounted slightly above its horizontal axis to receive milk into the top of the flask, and then permit discharge of the milk from the flask by rotating the flask 180 degrees. The flask is preferably made out of glass in order that the milk may be observed through the wall of the flask.

The glass flask of the measuring device is ideal for visibility, compactness, and lends itself to ready cleaning-in-place.

Not only is the device usable for measuring milk, but it also provides a large volume which is normally evacuated, and which device is located adjacent the station at which a cow is milked whereby the device provides in effect a reservoir as a vacuum reserve close to the udder which promotes better and faster milking.

The measuring device is carried or mounted approximately at the same elevation of or slightly below the udder of the cow, so that milk flowing from the udder drops in the flask below the vacuum and milk lines connected to the upper end of the flask, and thus the milk becomes trapped in the flask. There is a constant vacuum pressure in the flask. This constant pressure operates the milking unit which sets up an intermittent vacuum application to the cow's teats inducing the milk flow into the flask.

Since there is no appreciable lift, if any, of the milk flowing from the cow into the flask there is no use of the vacuum pressure in that regard and therefore the flask internal pressure remains unaffected.

After the cow is milked, the flask is then rotated one hundred eighty degrees to bring the milk over the vacuum line connection, thereby subjecting the milk to the influence of vacuum lifting action. The milk then flows out the vacuum hose into the milk pipe line in a continuous column rather than by intermittent slugs or volumes. This operation avoids heretofore known churning of the milk in elevating the milk in an upwardly extending hose or line by intermittent batches or quantities of milk separated one from the other, sometimes dropping back between gaps between those batches, doing so a number of times until the batches may consolidate and be carried on to the pipe line in a churning action. This invention avoids that action. All the milk flows out in a continuous hose-filled stream.

By making the measurer out of glass, the operator can see at a glance the relative amount of milk being produced by each cow, and moreover can observe quickly whether or not the cow may be producing bloody milk, or whether there are coagulated masses such as may be present in inflammation of the udder.

The measurer does not have to be hung on a scale since the flask is permanently graduated from bottom to top in weight markings for convenience of the operator. Since the flask and its markings constitute a laboratory procedure in its production, accuracy can be had to at least within two percent of the actual weight of the milk. The weight markings are permanently fired into the glass.

A further important object of the invention is to provide a measurer which will speed up the emptying of the flask of the contained milk, and also to provide a vent to the atmosphere during the emptying operation so that one or more of the teat cups do not have to be lifted for admittance of atmospheric air in order to permit the milk to leave the flask under vacuum pressure.

Furthermore the measurer has no corners, cracks or crevices within which bacteria may grow or even be present to contaminate the next filling of the flask. No gaskets nor valves are employed at the flask or between the flask and the milking claw.

These and many other objects and advantages of the invention will become apparent to those versed in the art in the following description of one particular form of the invention as illustrated in the accompanying drawings, in which FIG. 1 is a view in side elevation of a structure embodying the invention;

FIG. 2 is a view on a reduced scale in front elevation;

FIG. 3 is a bottom plan view;

FIG. 4 is a view in transverse section on an enlarged scale on the line 4—4 in FIG. 2;

FIG. 5 is a view on an enlarged scale in transverse section on the line 5—5 in FIG. 3;

FIG. 6 is a detail in side elevation and partial section through a bracket hanger construction; and FIG. 7 is a central vertical section in a diametrical plane of the flask on an enlarged scale on the line 7—7 in FIG. 1.

A glass flask 10 having a spherical shape is provided with a normally lower integral nipple 11. The flask is also provided with two nipples at its uppermost part extending from the flask, one nipple 12 extending radially from the flask on the same diametrical axis on which the lower nipple 11 is located. A second nipple 13 is also fixed to the top portion of the flask 10, to one side of the nipple 12, to extend from the flask at an acute angle such as approximately 45 degrees, herein shown as sloping to the left of the nipple 12 in FIG. 1.

This flask 10, while herein shown as being spherical, may be elongated in respect to its central normally vertical axis when receiving milk or even its horizontal control axis, approximately an ellipsoidal shape. That is to say, the flask does not necessarily have to have a spheroid shape, but washing the flask internally is better facilitated when it is spheroidal.

The flask 10 is carried within a skeleton frame comprising upper and lower circular rings 14 and 15. These two rings 14 and 15 have internal diameters one equal to the other, and less than the major diameter of flask 10. These two rings 14 and 15 are interconnected to be spaced apart in fixed relation by means of a pair of arms 16 and 17. The lower ends of these arms are fixed to the lower ring 15 by any suitable means, such as by welding, and extend upwardly to the upper ring 14 where the upper ends of the arms 16 and 17 are detachably interconnected in each instance to the ring 14, in any suitable manner, such as by screw means 18 passing through a lug 19 in each instance against the underside of which lug the top ends of the arms 16 and 17 abut, the screw means consisting of a screw in each instance passing down through the lug 19 into the top ends of the arms 16 and 17.

Each of the rings 14 and 15 is provided with a plurality of rubber buttons 20 extending inwardly thereof toward the centers of the rings. These buttons may be held by the rings in any suitable manner, herein shown, FIG. 5, as having in each instance a shank 21 entering a hole 22 in the ring, the shank 21 being compressibly urged into the ring 14 to seat the button 20 against the ring. The buttons 20 are held in the ring 15 in the same identical manner. By reason of the presence of the buttons 20 extending inwardly from both rings, the glass flask 10 rests against the buttons 20 of the lower ring 15 and the flask is retained in position against the ring 15 by the buttons 20 of the ring 14 pressing inwardly, the two rings 14 and 15 being spaced above and below respectively of the normal horizontal, diametrical plane through the flask.

An overhead bar or tube 23 is fixed into position normally across the space (not shown) in which the operator works during the milking operation. The important thing is that the tube 23 is fixed into position and against rotation.

A pair of spaced apart legs 24 and 25 are suspended in spaced apart relation from the tube 23, both in fixed relation thereto. Preferably, although not necessarily so, both legs 24 and 25 are formed of rectangular tubing. An under half 60 of the bracket generally designated by the numeral 61 is fixed in each instance to the upper end of the legs 24 and 25 to fit up against the under side of the tube 23. A companion portion of the bracket 61 designated by the numeral 26 fits over the top of the tube 23 in each instance and tends to pull the lower bracket portion 60 upwardly against the under side of the tube 23 by means of bolts 27. The bracket portions 60 and 26 are so formed that when the bolts 27 are thoroughly drawn up, the bracket 61 in each instance engages the tube 23 so that the legs 24 and 25 will not tend to rock therearound, but are positioned to hang normally downwardly therefrom. In order to prevent slippage of the brackets 61 around the tube 23, additional securing means may be employed, as shown in FIG. 6, such as by use of a split tubular pin 28 extending substantially diametrically through the tube 23 and by ends through the bracket portions 60 and 26.

Each of the arms 16 and 17 has an outwardly extending boss 29, FIG. 4, which is so sized as to bear rockably against the opposing inner faces of the lower end portions of the legs 24 and 25, FIG. 2. A cap screw 30 extends preferably through a washer 31 on the outside of the leg 24, through an internal sleeve 32, and screw-threadedly engages in the boss 29. The length of the sleeve 32 is made to be such that the washer 31 bears firmly thereagainst so as to permit rocking of the cap screw 30, to all intents and purpose being an integral part of the boss 29. The same structure applies to the mounting of the arm 17 on the leg 25. The arms 16 and 17 will have lower portions extending below the lower ends of the legs 24 and 25, FIG. 2 with the flask 10 turned in its upright position.

One of these arms 16 and 17, herein shown as arm 17, carries integral stops 33 and 34, stop 33 being just below the ring 14 and stop 34 being just above the ring 15, FIG. 2. In the position indicated in FIGS. 1 and 2, the stop 33 will be bearing against the side of the leg 25. When the flask 10 is rotated 180 degrees, the stop 34 will come around against the opposite side of the lower end portion of the leg 25.

An automatic vent is provided to be mounted on the nipple 11. This vent generally designated by the numeral 35 has a rubber cup 36 made out of a flexible, elastic material such as rubber which fits compressibly around and over the nipple 11. The cup 36 has a floor 37 which will abut the outer end of the nipple 11 when the outer wall portion 38 of the cup 36 engages circumferentially around a substantial length of the nipple. The cup has a cylindrical downwardly extending body 39 through which there is axially carried a metal tube 40 which is secured at its upper end at the floor 37 by a flared out portion 41, and which by its lower end extends by a portion 42 below the lower end 43 of the body 39. The tube is permanently open throughout its length from the portion 41 to the lower portion 42. A metal cylinder 44 frictionally engages around the body 39. A transverse shaft 45 is fixed to the lower end portion of the cylinder 44 by any suitable means, such as by welding, to extend laterally in both directions beyond the outer circumferential surface of the cylinder 44. A U-shaped channel member 46 straddles by an end portion the lower end of the body 39 and the cylinder 44, and is rockably mounted by having the pin 45 extend through the upstanding walls 47 and 48 of the member 46. A weight 49 is fixed to the under side of the member 46 at its end fartherest removed from the body 39. By reason of this weight, the member 46 which extends by its major length beyond the axis of the pin 45 will cause the shorter end of the member 46 to rock upwardly toward the end 42 of the tube 40. A rubber button 50 is mounted on this end 51 of the member 46 so as to come up and close off the lower end of the tube 40.

As was not mentioned above, the legs 24 and 25 are preferably stabilized against tendency to swing in a plane parallel with the axis of the tube 23. In order to accomplish this, a stabilizing bar 52 is placed between the legs 24 and 25 below the tube 23 and above any extending portion of the flask 10 as it may be rocked between its two 180 degree apart positions. This bar 52 is secured by its ends to the legs 24 and 25 by any suitable means such as by welding. Thus by use of the bar 52, the legs 24 and 25 which in normal usage, will have to extend downwardly from the supporting tube 23 some little distance, are stabilized and the flask 10 is held against "bouncing" around.

*Operation*

For the reason that the invention is believed to be more clearly shown in the absence of milk conducting tubes, and the carry-away pipe line, these elements are not herein shown. It is sufficient to say that the milk tube leading from a milking unit will be engaged over the nipple 13 as a milk inlet to the interior of the flask 10. The other nipple 12 will be interconnected through a flexible tube to the milk carry-away line. As is well known to those versed in the art, the carry-away line is partially evacuated, which means that the interior of the flask 10 is also evacuated, and this vacuum pressure is thus made evident through the milk tubing from the inlet 13 to the milking unit so that the milking operation may be performed normally under the vacuum thus at hand.

The vacuum pressure in the milk line and the flask will remain substantially constant—not intermittently fluctuating. The large volume of the flask aids in maintaining a constant vacuum pressure therein.

During the milking operation, as above indicated, the flask 10 will be in the upright position as indicated in FIGS. 1 and 2, where both nipples 12 and 13 are on the upper side of the flask 10. The milk coming through the inlet 13 will tend to flow around the inner surface of the flask 10 in part at least as it enters the flask under the pulsing flows, and thus, come around to the inner bottom side of the flask 10 without undue splashing and churning. As the milk rises in the flask 10, its quantity will be made evident by the register of the upper surface of the milk with the exteriorly presented markings herein shown as ranging from the numeral 1 to numeral 44, these numerals indicating pounds. Obviously, other means may be employed to measure the flask contained milk, such as by a conventional central dip stick, or some well known internally provided indicator. When the cow has been fully milked, there will be no milk coming through the nipple 13 and this fact may be readily observed by glancing through the flask 10.

Upon the completion of the milking operation, the claw will be taken from the cow by removing the teat cups which normally drop downwardly to shut off atmospheric pressure to the milk conveying tubes, and this claw is then hung to be in a position above the top of the flask 10. The flask 10 is then rotated on the two cap screws 30 to invert the flask and bring the two nipples 12 and 13 to their lowermost positions with the vent 35 then uppermost. The nipple 12 being interconnected with the milk carry-away line, milk will promptly start flowing from the flask 10 through the nipple 12 to the pipe line. This is made possible (it being remembered that the flask 10 is normally evacuated) by reason of the weight 49 dropping downwardly toward the flask under the influence of gravity thus opening the vent through the tube 42 to subject the interior of the flask 10 to atmospheric pressure. The nipple 12 being on the then under side of the flask 10 will permit the last drop of milk to be pulled into the pipe line. The next cow will then be milked in the same manner through the same flask 10, and the operation repeated.

Following the milking operation and the milk has flowed from the flask 10, a washing solution is introduced into the flask 10 through the nipple 13 so that there will be a tendency for this solution to spread out over the interior surface of the flask following which the flask 10 will be inverted to have the washing solution carried out through the nipple 12 to the milk carry-away line. Rinsing solutions if employed may likewise follow the same pattern in entering and leaving. If and when it becomes necessary, for sanitary purposes, the vent mechanism 35 may be detached from the nipple 11 and inasmuch as it has no hidden crevices or cracks, may be readily washed and returned to its position for further use.

Thus it is to be noticed that there are no valves in the lines leading to or from the nipples 13 and 12 so that bacteria colony growing sources which were formerly present in the use of such valves are eliminated and thus better sanitation is maintained. While I have herein shown and described my invention in the one particular form, it is obvious that structural variations may be employed without departing from the spirit of the invention, and I therefore do not desire to be limited to that precise form beyond the limitations which may be imposed by the following claims.

I claim:

1. A device for measuring milk to be positioned intermediate a milker and an evacuated milk carryaway pipe line comprising a flask; a pair of nipples extending from a normally top side of the flask; a third nipple extending from the underside of the flask; a flask carrier cage; a pair of legs; a support member to which the legs are fixedly attached in spaced apart relation; means rockably interengaging said cage and lower end portions of said legs; means located externally of said flask closing off said third nipple and automatically venting the flask through the third nipple to the atmosphere upon rocking the flask toward a position with said pair of nipples undermost; said external venting means comprising an elastic cup engaged around said third nipple, the cup carrying a body portion beyond the third nipple with a passageway communicating with and opening externally of the nipple and said body portion; a rocker member rockably carried by said cup extending primarily to one side thereof, a closure member in the path of said external opening, and a weight on the end of the rocker member normally rocking said closure member to close off said opening when said third nipple extends downwardly, and rocking the closure member from said opening when the third nipple is upwardly directed.

2. In a milk receiving device, a flask; a flask milk inlet nipple; a flask evacuating nipple adjacent the milk inlet nipple; a flask vent nipple located approximately one hundred eighty degrees around the flask from said inlet and evacuating nipples; all three of said nipples forming external parts of said flask; means rockably supporting said flask to allow it to rock through said degrees; a valve carried by said vent nipple closing off the nipple when said inlet nipple is uppermost and opening the nipple when said vent nipple is uppermost; said valve comprising an elastic body externally, compressively engaging over said vent nipple; said body having a substantially rigid walled passageway therethrough opening by one end into the vent nipple and by its other end externally of the body; a rocker member; means hingedly supporting said member from said body and intermediate opposite end portions of the member, a weight on one member end portion to one side of said valve body; and a closure member carried by said rocker member closing and opening said body passageway other end, opening upon rocking of said flask to an under position of said vent nipple and to an upper position of the vent nipple.

References Cited in the file of this patent

UNITED STATES PATENTS

| | | |
|---|---|---|
| 420,320 | Wagner | Jan. 28, 1890 |
| 811,102 | Smith | Jan. 30, 1906 |
| 1,533,582 | Di Bernardi | Apr. 14, 1925 |
| 2,419,786 | Meehan | Apr. 29, 1947 |
| 2,853,050 | Golay | Sept. 23, 1958 |